Dec. 27, 1960 V. E. GLEASMAN 2,966,223
MOTOR VEHICLE FOR TRAVERSING IRREGULAR TERRAIN
Filed March 25, 1957 5 Sheets-Sheet 1

INVENTOR.
VERNON E. GLEASMAN
BY
RICHEY, WATTS, EDGERTON,
McNENNY & FARRINGTON
ATTORNEYS

Dec. 27, 1960 V. E. GLEASMAN 2,966,223
MOTOR VEHICLE FOR TRAVERSING IRREGULAR TERRAIN
Filed March 25, 1957 5 Sheets-Sheet 2

INVENTOR.
VERNON E. GLEASMAN
BY
RICHEY, WATTS, EDGERTON,
MCNENNY & FARRINGTON
A.H. Edgerton
ATTORNEYS

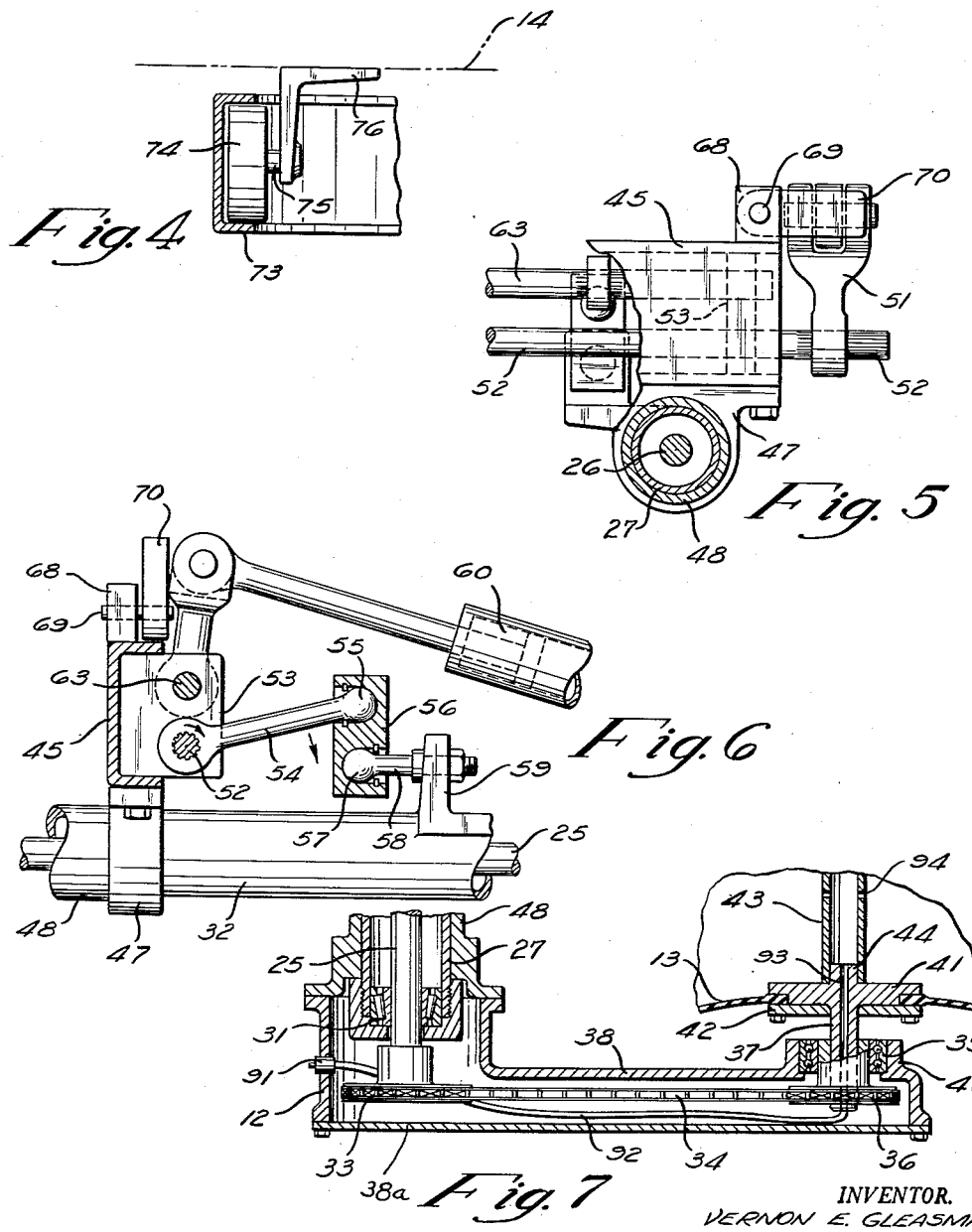

Dec. 27, 1960 V. E. GLEASMAN 2,966,223
MOTOR VEHICLE FOR TRAVERSING IRREGULAR TERRAIN
Filed March 25, 1957 5 Sheets-Sheet 4

INVENTOR.
VERNON E. GLEASMAN
BY
RICHEY, WATTS, EDGERTON,
McNENNY & FARRINGTON
ATTORNEYS

Dec. 27, 1960 V. E. GLEASMAN 2,966,223
MOTOR VEHICLE FOR TRAVERSING IRREGULAR TERRAIN
Filed March 25, 1957 5 Sheets-Sheet 5
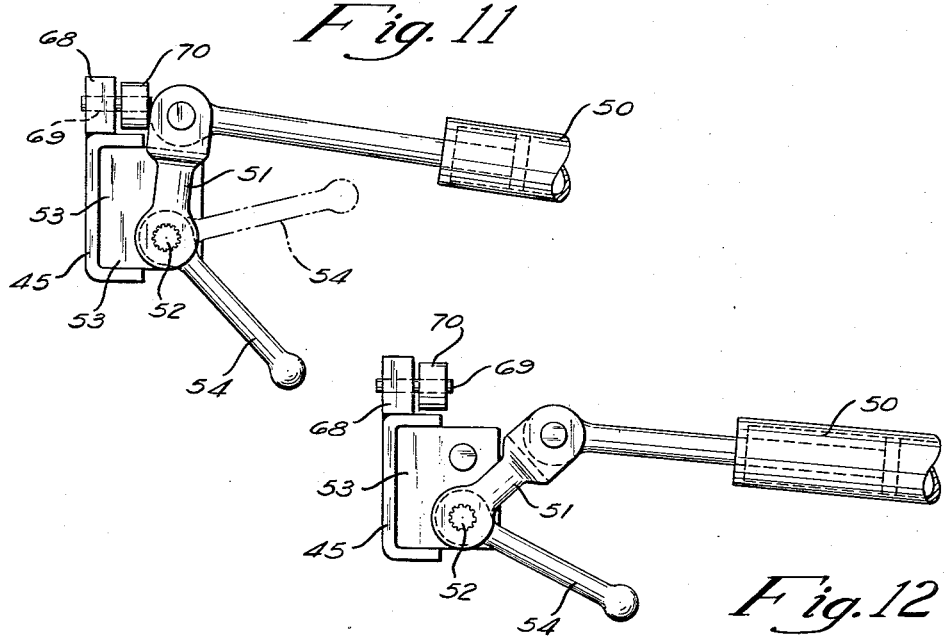
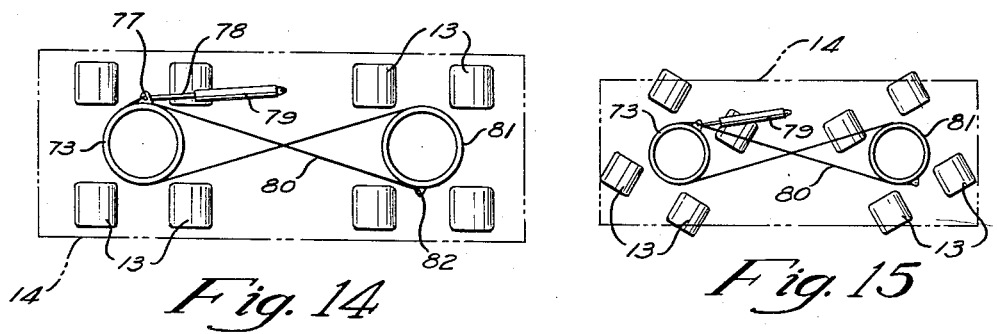
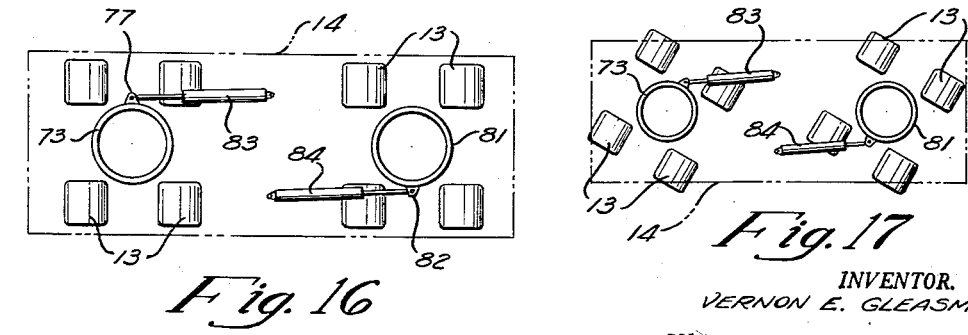
INVENTOR.
VERNON E. GLEASMAN
BY
RICHEY, WATTS, EDGERTON,
McNENNY & FARRINGTON
ATTORNEYS United States Patent Office 2,966,223
Patented Dec. 27, 1960

2,966,223
MOTOR VEHICLE FOR TRAVERSING IRREGULAR TERRAIN

Vernon E. Gleasman, Cleveland Heights, Ohio, assignor to The White Motor Company, Cleveland, Ohio, a corporation of Ohio Filed Mar. 25, 1957, Ser. No. 648,370

9 Claims. (Cl. 180—23)

This invention relates broadly to motor vehicles and more specifically to improvements in the running gear and driving mechanism therefor.

In detail, the invention contemplates an organization of driven low pressure pneumatic cylinders, in lieu of wheels, which are designed to facilitate negotiation of the vehicle over irregular terrain, sharp acclivities, marsh lands, bodies of water, and snow or sand of the type that is readily displaced when a load is imposed thereon.

The invention further comprehends a vehicle of limited size so that it may be shipped with ease and dispatch, a vehicle of limited weight so the ground pressure or inflation of the pneumatic cylinders may be relatively low, a vehicle of an amphibious character, an air cylinder or pneumatic roller that can be inflated during the translation of the vehicle, and an air cylinder supporting structure that is designed to accommodate vertical adjustment thereof, and a novel arrangement of differential gears in the driving mechanism for the pneumatic cylinders to eliminate torsion strains on the end walls of the cylinders.

In addition to the foregoing objects of the invention, the vehicle further includes a structure which is economic of manufacture, efficient of operation, a vehicle which will maintain the body in a substantial horizontal plane when driven on the side of a hill, and a vehicle that embodies a steering mechanism, brakes, and driving connections that are readily accessible for the purpose of adjustment or repair.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 4 is a vertical sectional view through a portion of the fifth wheel supporting structure, the section being taken on a plane indicated by the line 4—4 in Fig. 2;

Fig. 5 is a vertical section through the end of one of the drive axles, the section being taken on the line 5—5 of Fig. 2;

Fig. 6 is a vertical sectional view through a fragmentary portion of the frame, one of the torque rods, and roller yoke sleeve control mechanisms, the section being taken on a plane indicated by the line 6—6 in Fig. 2;

Fig. 7 is a horizontal section through a fragmentary portion of one of the cylinder or roller supporting yokes, the section being indicated by the line 7—7 in Fig. 1;

Figs. 11 and 12 are rear elevational views of the cylinder yoke arms illustrating the normal and actuated positions of the torque rod;

Fig. 13 is a diagrammatic view of the cylinder control panel;

Fig. 14 is a plan view shown somewhat diagrammatically of the steering mechanism;

Fig. 15 is a similar view shown on a reduced scale showing the position of the cylinders in their actuated position;

Fig. 16 is a diagrammatic view of an alternate form of steering linkage; and

Fig. 17 is a similar view shown on a reduced scale, illustrating the actuated position of the cylinders.

Figure 1:
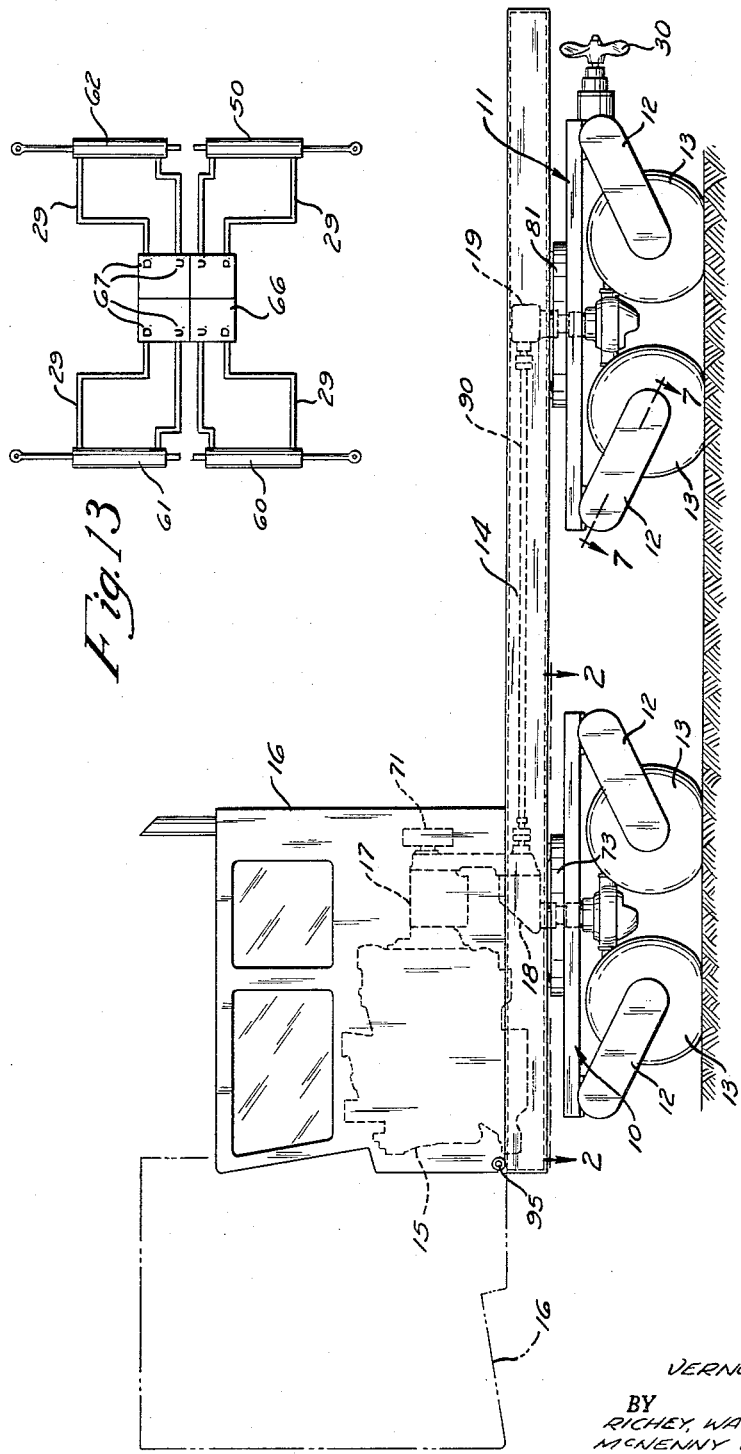
Fig. 1 is a side elevational view of the improved vehicle.

Referring first to Fig. 1, the vehicle comprises a front chassis frame 10, a rear chassis frame 11, a plurality of pivotally mounted yokes 12 for the support of pneumatic cylinders 13, a hollow or honey comb or foam filled fiber glass platform 14 mounted on the chassis frames 10 and 11, an engine 15 carried thereby and a cab 16 on the platform.

Figure 2:
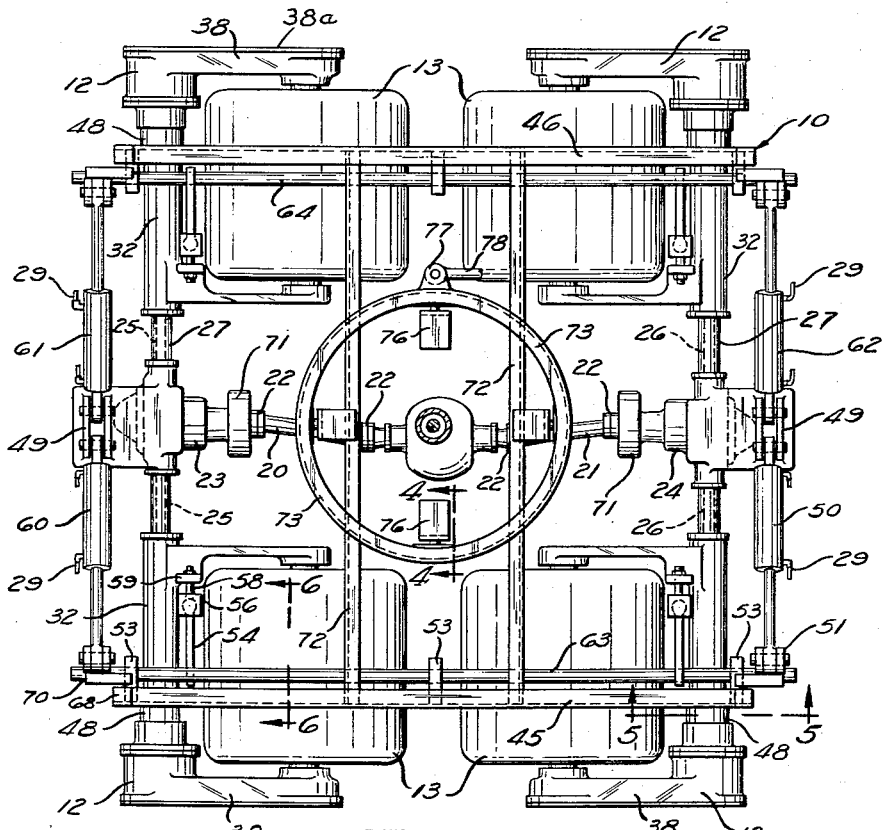
Fig. 2 is a transverse sectional view of the forward end of the vehicle chassis, the section being indicated by the line 2—2 in Fig. 1.
Figure 3:
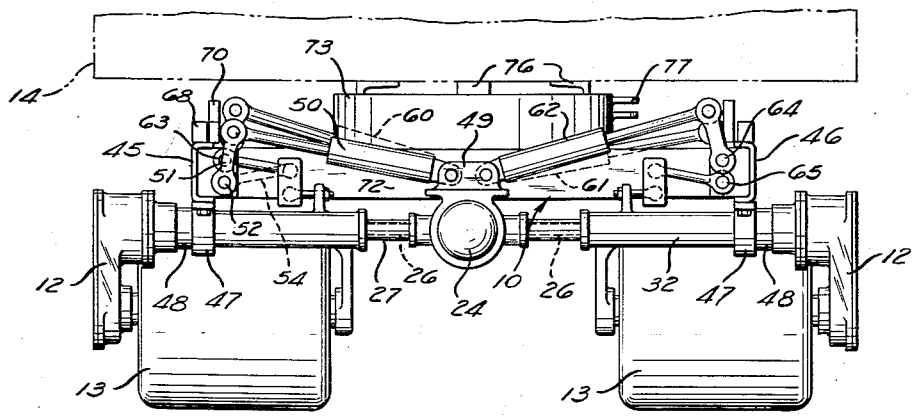
Fig. 3 is a rear elevational view of the portion of the vehicle illustrated in Fig. 2.

The engine is provided with a transmission gearing unit 17 which is operatively connected with drive shaft and bevel gear sets 18 and 19 pivotally mounted respectively on the forward chassis frame 10 and rearward chassis frame 11. As will be seen in Fig. 2, the forward bevel gear set is coupled with aligned propeller shafts 20 and 21 through universal joints 22, each propeller shaft being connected to differential gearing in housings 23 and 24 and in turn to drive axles 25 and 26 in dead axle housings 27. The drive axles are operatively connected to chain and sprocket assemblies (Fig. 7) in the outer arms of the yokes 12 for the pneumatic cylinders 13. The structure of the driving mechanism in the rearward chassis frame 11 is the same as that just described, save that an additional shaft is provided in the differential for driving a marine screw propeller 30. The shaft 25, like the similar drive shafts in the other axle assemblies, is mounted in an anti-friction bearing 31 in the outer end of the dead axle housing 27. The drive shaft has a sprocket 33 keyed thereon which carries a chain 34 coupled with a second sprocket 36 affixed to a flanged stub shaft 37 in the ends of the outer yoke arms 38. The stub shaft is mounted in anti-friction bearings 39 in bosses 40 in each arm 38, and the flange 41 is clamped to the end wall of the cylinder 13 by a companion ring 42. Discs (not shown) may be secured on the ends of the bosses for the bearings 39 to preclude the admission of dirt and water. A tube 43 is welded on a pilot boss 44 on the inner face of the flange 41 and is extended through the cylinder 13 to form an axle therefor. The opposed end of the cylinder is supported in a like manner on a flanged stub shaft mounted in anti-friction bearings appropriately sealed on the other arm 38 of the cross tubes 32 of the yoke 12. The yokes 12 are journaled on the dead axle housing 27 and are secured to the channel rails 45 and 46 of the chassis frame by saddle blocks and bearing caps 47, the yokes being restrained from axial movement by shoulders 48 engaged with the bearing caps 47. The chains 34 are covered by plates 38a bolted to the outer arms of the yokes 12. The yokes are rotatively adjusted by torque rods coupled with hydraulic cylinders pivotally mounted in bosses 49 on the differential housings 23 and 24. As will be seen in Figs. 2 and 3, the cylinder 50 is pivoted to an arm 51 which is splined to the torque rod 52 journaled in bearing blocks 53 secured in the channel rails 45 and 46. The opposed end of the torque rod 52 has a second arm 54 splined thereon which is coupled through a ball joint 55 (Fig. 6) to a link 56 having a spherical cup therein for the reception of a similar ball joint 57 on a stud 58 rigidly secured in a bracket 59 welded to the cylindrical body of the yoke 12. The cylinders 60, 61 and 62 are connected in a like manner to the torque rods 63, 64 and 65 so that operation of the pistons in the cylinders will actuate the arms similar to the arm 51, effect the rotation of the rods, the consequent arcuate movement of the second arms on the opposed ends thereof, and rotative movement of the yokes 12.

The torque rods are journaled in the bearing blocks 53 (Figs. 5 and 6) in vertical spaced alignment, and the brackets 59 are mounted in off-set relation to the pivotal axis of the yoke tube 32 to effect maximum rotative movement thereof upon operation of the pistons in the cylinders. In assembly, the vehicle is elevated, and the arms 54 are mounted on the torque rod in a downwardly inclined position (Fig. 11), thereafter, the vehicle is lowered to impose the weight thereof on the yokes and arms 54 so the rods 52, 63, 64 and 65 will receive their initial torque strain or preload adjustment. Each end of the cylinders 50, 60, 61 and 62 are provided with conduits 29 leading to a panel 66 in the cab 16 having valves 67 connected thereto so the operator can elevate and lower the yoke arms and cylinders 13 when the vehicle negotiates inclined terrain. From the foregoing, it will be seen that the torque rods not only facilitate vertical adjustment of the pneumatic cylinders at the will of the operator, but afford a resilient support for the yoke arms, thus relieving the road shock and vibrational strain transmitted to the vehicle.

The channel rails 45 and 46 have rectangular blocks 68 welded upon the upper faces thereof (Figs. 2, 3, 5, 6, 11 and 12) adjacent the ends of the piston rods in the cylinders 50, 60, 61 and 62, and the body of these blocks are drilled for hinge pins 69 for the pivotal support of pawls 70 adapted when adjusted forwardly of the piston rods to limit the outward movement of the pistons. When the height of the vehicle is too great to accommodate the entry thereof through a passageway of limited dimensions, such as the doorway in a box, car or cargo airplane, the pawls 70 may be lifted to permit distention of the piston rods to their outermost position (about four inches) thus affording additional rotative movement of the yokes and further retraction of the pneumatic rollers or cylinders 13.

The propeller shafts 20 and 21 and the drive shaft in the transmission unit 17 are provided with brake drums 71 and brake linkage of the usual form (not shown) for controlling the speed of the vehicle. The chassis frames 10 and 11 are formed with cross rails 72 adjacent the central portion thereof which supports a circular channel iron fifth wheel 73 having wheels 74 mounted thereon (Fig. 4) for free rotative movement between the flanges of the channel. The wheels are rotatably supported by pins 75 mounted on angle iron brackets 76 secured to the lower face of the platform 14. As shown in the preferred form illustrated in Fig. 14, the fifth wheel 73 is formed with a lug 77 in the circumferential face thereof between the channel iron flanges which is fabricated for a pivotal connection with a piston rod 78 in a hydraulic cylinder 79 having conduits thereon which lead to control valves in the cab 16. The cylinder 79 is pivoted on the lower face of the platform 14. The lug is also coupled with a cable 80 which is wrapped around the fifth wheel, then crossed and wound about the second fifth wheel 81 on the rearward chassis frame 11. The cable terminates in an eye in a lug 82 on the wheel 81 on the face thereof, diametrically opposed to the lug 77 in the wheel 73. When the piston in the cylinder is actuated, the wheel 73 will be rotated clockwise and the wheel 81 will rotate counter-clockwise (Fig. 15), thus affording a short radius turn and tracking of the front and rear pneumatic cylinders. In the form illustrated in Figs. 16 and 17, the lugs 77 and 82 are connected respectively to the piston rods in separate cylinders 83 and 84 which are connected by pressure fluid lines to the control valves in the cab. In the latter case, the pneumatic cylinders may be adjusted so the vehicle can be driven up a hill or in a straight line on the side of an inclined bank.

The platform 14 comprises a hollow prismoidal fiber glass body formed with a forward recess 85 therein for the reception of the engine, a contiguous recess 86 to receive the gear housing 18, a third recess 87 for the housing 19, and a lineal groove 88 intermediate the recesses 86 and 87 for the propeller shaft 90 from the engine. The buoyancy of the platform 14 and the pneumatic cylinders 13 floats the vehicle with a draft of approximately one-half the thickness of the platform. The walls of the platform may be formed of spaced upper and lower sheets of metal or fiber glass having a core of spongy plastic or a honey comb structure therein.

Figure 8:
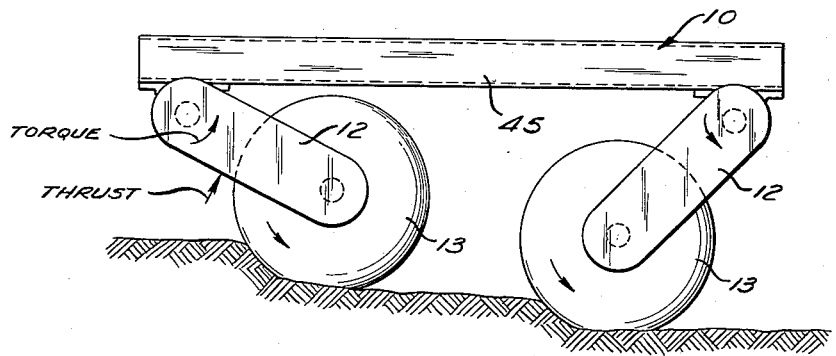
Fig. 8 is a side elevational view shown somewhat diagrammatically of the one pair of the pneumatic cylinder supporting yokes.

In the machines, heretofore in use, such as those of the rocker arm type, the roller tire cylinders were mounted on bogies fulcrumed between the cylinders to the chassis frame. With such construction, the lines of torque and thrust are in a downward direction causing the forward cylinder to move downwardly in soft terrain, while in the present case, as shown in Fig. 8, the torque and thrust are in an upward direction and attain a surfboard effect which will permit the pneumatic cylinders to surmount obstructions in a roadway and/or irregularities in the terrain.

Figure 9:
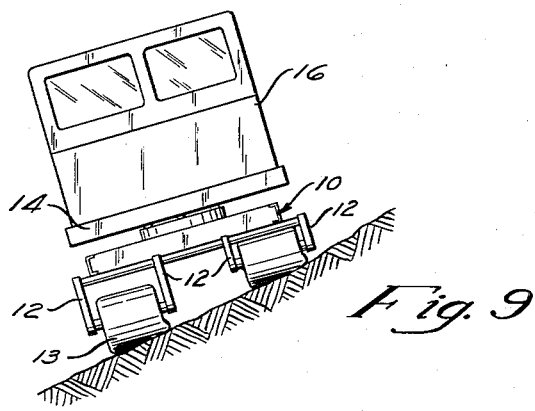
Fig. 9 is a diagrammatic view of the vehicle being operated on the side of a hill.
Figure 10:
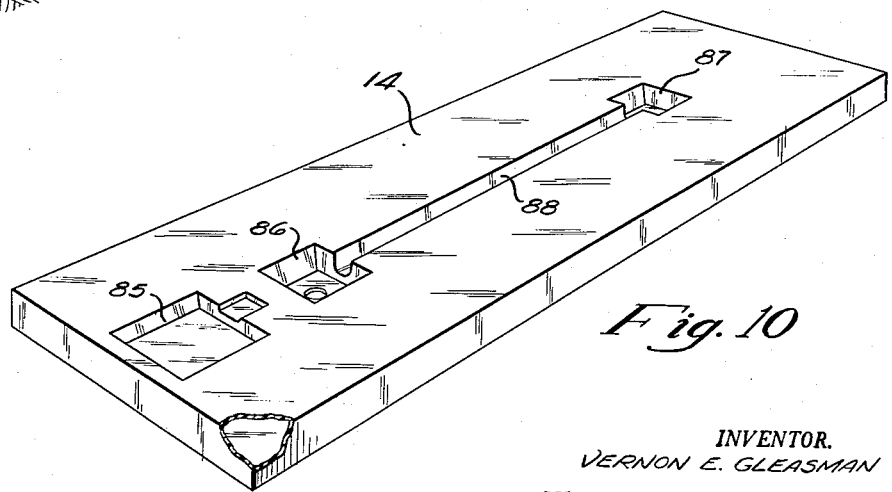
Fig. 10 is a view in perspective of the hollow or foam or honey comb filled fiber glass chassis platform.

The arms 12 are drilled and tapped to receive air valves 91 (Fig. 7) and air lines 92 which lead to a canal 93 in the stub axles 37 that communicate with the tubes 43 that form the axles for the cylinders 13. The tubes are cross drilled to provide openings 94 so the pneumatic cylinders may be inflated after assembly. The air pressure is normally maintained at about two pounds, though it may be raised to about seven pounds when the vehicle traverses a paved roadway. The pressure in cylinders 13 on one side of the vehicle may be reduced, and the opposing yoke arms lowered to support the body of the vehicle in a substantially horizontal plane when the machine negotiates a hillside transversely in the manner illustrated in Fig. 9.

The cab 16 is preferably of the tilting type being fulcrumed on pintles 95 supported in the forward end of the platform 14 for forward swinging movement as shown in the dot-dash lines in Fig. 1.

As shown in Fig. 1, the rearward portion of the platform is illustrated without a load carrying body therein. It is to be understood, however, that various types of cargo bodies, such as a personnel carrier, an ambulance or stake body, any of which will counter-balance the weight of the engine.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A vehicle for traversing irregular terrain comprising a platform, an engine mounted thereon, front and rear chassis sub-frames mounted for pivotal movement in a horizontal plane on the ends of said platform, yokes embodying spaced arms and a cross tube, said cross tube pivoted for vertical movement of the free ends of said arms, low pressure pneumatic cylinders mounted for rotative movement about the medial axis thereof between the free ends of the arms of said yokes, drive shafts in said yoke cross tubes, driving connections from said engine to said drive shafts and from said drive shafts to said pneumatic cylinders, axle housing connected to said yoke cross tubes, hydraulic piston cylinder assemblies pivotally mounted on said axle housings, links pivotally connected to the piston rods in said piston cylinder assemblies, torsion rods keyed at one end to said links, and lever arms keyed to the opposed end of said torsion rods, said lever arms being pivotally connected to said yoke cross tubes for rotating said yokes to raise and lower the said pneumatic cylinders.

2. A vehicle for traversing irregular terrain comprising a platform, front and rear chassis frames mounted thereon, yokes pivoted on the front and rear ends of said frames, arms on said yokes, pneumatic cylinders supported by said arms, the forward arms being inclined downward and rearwardly and the rearward arms being inclined downwardly and forwardly, torque rods for swinging said arms upwardly and downwardly, actuating mechanisms for rotating said torque rods, an engine on said platform superjacent said forward chassis frame, and driving connections between said engine and said pneumatic cylinders.

3. A vehicle for traversing irregular terrain comprising a platform, front and rear chassis frames mounted thereon, yokes pivoted on the front and rear ends of each chassis frame, arms on said yokes, pneumatic cylinders supported by said arms, axle housings for said yokes, means supported by the frames for swinging said yokes to raise and lower said pneumatic cylinders, an engine on said platform superjacent one of said chassis frames and driving connections between said engine and said pneumatic cylinders for the rotation thereof, a fifth wheel affixed to each of said chassis frames and pivotally connected to said platform, hydraulic piston cylinder assemblies supported by said platform, the piston rods of said cylinder assemblies being pivotally connected, respectively, to one side of each of said fifth wheels, and hydraulic means for actuating the piston in said piston cylinder assemblies.

4. A vehicle for traversing irregular terrain comprising a platform, front and rear chassis frames mounted thereon, yokes pivoted on the front and rear ends of said frames, arms on said yokes, low pressure pneumatic rollers pivoted for axial rotation on said yokes, axles therefor, torsion rods operatively connected to said yokes for swinging the yokes to raise and lower said pneumatic rollers, an engine on said platform superjacent the forward chassis frame, drive shafts operatively connected to said engine, and chains in the arms of said yokes connected, respectively, to said drive shafts and to said pneumatic roller axles for the rotation of said pneumatic rollers.

5. A vehicle for traversing irregular terrain comprising a platform, front and rear chassis frames mounted thereon, yokes pivoted on the front and rear ends of each of said frames, low pressure pneumatic rollers axially rotative on the ends of said yokes, torsion rods for the rotative movement of said yokes, arms on said torsion rods connected to said yokes, piston cylinder assemblies mounted on each of said frames and operatively connected to said torsion rods, an engine mounted on said platform superjacent the forward chassis frame, and driving connections from said engine and through the base of said yokes for driving said rollers.

6. A vehicle for traversing irregular terrain comprising a platform, an engine mounted thereon, front and rear chassis frames pivotally mounted on said platform, yokes pivoted for vertical movement of the free ends thereof on the front and rear ends of each of said frames, arms on said yokes, low pressure pneumatic cylinders mounted for axial rotative movement between the free ends of said arms, torsion rods for each of said yokes, linkage pivoted to said yokes and keyed to said torsion rods for the transmission of rotary movement from said torsion rods to said yokes, cylinder piston assemblies mounted on each of said frames connected to said torsion rods for the rotative movement thereof, hydraulic connections to said cylinder piston assemblies for the actuation thereof, said engine being mounted on said platform superjacent one of said chassis frames, drive shafts connected to said engine and to an arm of each of said yokes, and chain and sprocket driving connection in said arms from said drive shafts to said pneumatic cylinder for the rotative movement thereof.

7. A vehicle for traversing irregular terrain comprising a platform, an engine mounted thereon, front and rear chassis frames pivotally mounted on said platform, yokes pivoted about horizontal axes for movement in a vertical plane on the front and rear ends of each of said frames, low pressure pneumatic cylinders axially rotatable between the arms of said yokes, torsion rods for raising and lowering said yokes, piston cylinder assemblies for rotating said torsion rods, arms keyed to said torsion rods and pivotally connected to the piston rods, second arms keyed to the other ends of said torsion rods, links connected to said second arms, lugs on said yokes connected to said links, whereby actuation of the pistons in said piston cylinder assemblies will effect rotary motion of said torsion rods and rotate said yokes, said engine mounted on said platform superjacent said forward chassis frame and driving connections from said engine to said pneumatic cylinders for the rotation thereof.

8. A vehicle for traversing irregular terrain comprising a platform, an engine mounted thereon, front and rear chassis frames pivotally mounted on said platform, yokes pivoted for vertical swinging movement on the front and rear ends of each of said frames, pneumatic cylinders supported for rotary movement in said yokes, tubes journaled in the free ends of the arms of said yokes constituting axles for said pneumatic cylinders, air valves connected with said tubes to accommodate inflation of said pneumatic cylinders, said engine mounted on said platform superjacent said front chassis frame, driving shafts connected to said engine, chains and sprockets in the arms of said yokes connected respectively to said drive shafts and said pneumatic cylinder axle tubes.

9. A vehicle for traversing irregular terrain comprising a platform, front and rear chassis frames mounted thereon, yokes pivotally mounted thereon, spaced parallel arms on said yokes, pneumatic cylinders pivoted on said arms of said yokes for axial rotation, torque rods for raising and lowering said yokes, piston cylinder assemblies secured to said frames and rods respectively for rotating said torque rods, an engine superjacent one of said chassis frames, drive shafts connected to said engine, sprockets and chains in said arms on said yokes connecting said drive shafts to said pneumatic cylinders, pivotally mounted stops adjacent the ends of the piston rods in said piston cylinder assemblies to delimit the translation of said pistons, whereby said stops may be swung away from the ends of said piston rods to afford additional translation of the piston and additional elevation of said pneumatic cylinders.

(References on following page)

References Cited in the file of this patent

UNITED STATES PATENTS

| | | | |
|---|---|---|---|
| Re. 24,272 | Albee | Feb. 12, | 1957 |
| 1,162,640 | Morton | Nov. 30, | 1915 |
| 1,831,871 | McManus | Nov. 17, | 1931 |
| 1,930,208 | Marcum | Oct. 10, | 1933 |
| 2,024,199 | Barnes et al. | Dec. 17, | 1935 |
| 2,093,320 | Hunt | Sept. 14, | 1937 |
| 2,341,165 | Todd | Feb. 8, | 1944 |
| 2,374,196 | Harbers | Apr. 24, | 1945 |
| 2,400,132 | Porter | May 14, | 1946 |
| 2,552,690 | Poirier | May 15, | 1951 |
| 2,598,863 | Tucker | June 3, | 1952 |
| 2,802,541 | Albee | Aug. 13, | 1957 |
| 2,821,949 | Uyehara | Feb. 4, | 1958 |

OTHER REFERENCES

Publication, "Motor," April 1952, page 142, vol. 97, issue 4.